(12) United States Patent
Derby et al.

(10) Patent No.: US 10,601,894 B1
(45) Date of Patent: Mar. 24, 2020

(54) VECTOR-BASED ENCODING FOR CONTENT RENDERING

(71) Applicant: Amazon Technologies, Inc., Seattle, WA (US)

(72) Inventors: Justin Jon Derby, Seattle, WA (US); David Andrew Killian, Seattle, WA (US); Dmitry Sokolowski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 14/867,576

(22) Filed: Sep. 28, 2015

(51) Int. Cl.
*H04L 29/08* (2006.01)
*G06F 17/22* (2006.01)

(52) U.S. Cl.
CPC .......... *H04L 67/04* (2013.01); *G06F 17/2247* (2013.01); *G06F 17/2252* (2013.01); *G06F 17/2258* (2013.01); *H04L 67/02* (2013.01)

(58) Field of Classification Search
CPC .......... G06F 17/2247; G06F 17/30902; G06F 17/30905; G06F 17/2288
See application file for complete search history.

(56) References Cited

U.S. PATENT DOCUMENTS

| | | |
|---|---|---|
| 4,468,751 A | 8/1984 | Plunkett, Jr. |
| 5,828,370 A * | 10/1998 | Moeller ............... H04N 5/4401 715/720 |
| 6,061,798 A | 5/2000 | Coley et al. |
| 6,460,060 B1 | 10/2002 | Maddalozzo, Jr. et al. |
| 6,657,647 B1 | 12/2003 | Bright |
| 7,191,467 B1 | 3/2007 | Dujari et al. |
| 7,231,606 B2 | 6/2007 | Miller et al. |
| 7,512,932 B2 | 3/2009 | Davidov et al. |
| 7,617,458 B1 | 11/2009 | Wassom, Jr. et al. |
| 7,627,814 B1 | 12/2009 | Soldan et al. |
| 8,285,063 B2 | 10/2012 | Akenine-Möller et al. |
| 8,453,049 B1 | 5/2013 | Grieve et al. |
| 8,510,237 B2 | 8/2013 | Cascaval |
| 8,555,157 B1 * | 10/2013 | Fu ..................... G06F 17/30893 715/201 |
| 8,677,097 B1 | 3/2014 | Nemazie et al. |
| 8,762,878 B1 | 6/2014 | Weber et al. |

(Continued)

OTHER PUBLICATIONS

Allen, M., HydrateJS by nanodeath, Dec. 14, 2013, http://nanodeath.gihub.io/HydrateJS/.

(Continued)

*Primary Examiner* — Manglesh M Patel
*Assistant Examiner* — Nicholas Hasty
(74) *Attorney, Agent, or Firm* — Knobbe, Martens, Olson & Bear, LLP

(57) ABSTRACT

Minimizing bandwidth consumption in rendering dynamic content, such as video streaming. Traditional streaming video applications utilize lossy protocols that often result in degraded user experiences. A dynamic content encoder/decoder allows a server-based browser application to generate vector-based rendering instructions for processing by a client-based browser application. Additionally, as the dynamic content changes the content to be displayed, a server-based browser application generates updated vector-based instructions and encoded spatial and temporal differences to minimize the data transmitted to the client-based browser.

18 Claims, 6 Drawing Sheets

(56) References Cited

U.S. PATENT DOCUMENTS

| | | |
|---|---|---|
| 8,799,412 B2 | 8/2014 | Trahan et al. |
| 8,893,294 B1 | 11/2014 | Steele, III et al. |
| 9,167,054 B2 | 10/2015 | Trahan et al. |
| 9,201,850 B1 | 12/2015 | Buddhiraja et al. |
| 9,288,521 B2 * | 3/2016 | Reynolds ........... H04N 21/2668 |
| 9,292,367 B2 | 3/2016 | Mickens |
| 9,348,936 B2 | 5/2016 | B'far et al. |
| 9,383,932 B2 | 7/2016 | Das Sharma |
| 9,509,783 B1 | 11/2016 | Hayden |
| 9,749,202 B1 | 8/2017 | Jain et al. |
| 9,811,321 B1 | 11/2017 | Karppanen |
| 9,881,096 B1 | 1/2018 | Warr et al. |
| 9,888,074 B1 | 2/2018 | Roy et al. |
| 10,127,210 B1 | 11/2018 | Karppanen |
| 10,241,983 B1 | 3/2019 | Derby et al. |
| 10,296,580 B1 | 5/2019 | Pulla et al. |
| 10,341,345 B1 | 7/2019 | Johansson et al. |
| 10,348,797 B1 | 7/2019 | Burgin et al. |
| 10,372,780 B1 | 8/2019 | Lepeska et al. |
| 2001/0042045 A1 | 11/2001 | Howard et al. |
| 2001/0043800 A1 | 11/2001 | Gotoh et al. |
| 2002/0009078 A1 | 1/2002 | Wilson et al. |
| 2002/0013833 A1 | 1/2002 | Wyatt et al. |
| 2002/0133627 A1 | 9/2002 | Maes |
| 2002/0147788 A1 | 10/2002 | Nguyen |
| 2003/0014478 A1 | 1/2003 | Noble |
| 2003/0055610 A1 | 3/2003 | Webber |
| 2004/0015476 A1 | 1/2004 | Twaddle |
| 2004/0230903 A1 | 11/2004 | Elza et al. |
| 2005/0108627 A1 | 5/2005 | Mireku |
| 2005/0149718 A1 | 7/2005 | Berlin et al. |
| 2005/0198365 A1 | 9/2005 | Wei |
| 2006/0005114 A1 | 1/2006 | Williamson et al. |
| 2006/0010150 A1 | 1/2006 | Shaath et al. |
| 2006/0136552 A1 | 6/2006 | Krane et al. |
| 2006/0168101 A1 | 7/2006 | Mikhailov et al. |
| 2006/0282795 A1 | 12/2006 | Clark et al. |
| 2007/0005622 A1 | 1/2007 | Fernandes et al. |
| 2007/0127440 A1 | 6/2007 | Narayanaswami et al. |
| 2007/0192329 A1 | 8/2007 | Croft et al. |
| 2008/0005686 A1 | 1/2008 | Singh |
| 2008/0139191 A1 | 6/2008 | Melnyk |
| 2008/0313206 A1 | 12/2008 | Kordun et al. |
| 2009/0046935 A1 | 2/2009 | Akenine-Möller et al. |
| 2009/0138937 A1 | 5/2009 | Erlingsson et al. |
| 2009/0168760 A1 | 7/2009 | Katis et al. |
| 2009/0202159 A1 | 8/2009 | Ström |
| 2009/0210631 A1 | 8/2009 | Bosworth et al. |
| 2009/0287559 A1 | 11/2009 | Chen et al. |
| 2009/0319776 A1 | 12/2009 | Burch et al. |
| 2010/0005053 A1 | 1/2010 | Estes |
| 2010/0070928 A1 | 3/2010 | Goodger et al. |
| 2010/0077444 A1 | 3/2010 | Forristal |
| 2010/0082747 A1 | 4/2010 | Yue et al. |
| 2010/0161587 A1 | 6/2010 | Sullivan |
| 2010/0180225 A1 | 7/2010 | Chiba et al. |
| 2010/0312858 A1 | 12/2010 | Mickens et al. |
| 2010/0313065 A1 | 12/2010 | Feeley et al. |
| 2010/0313189 A1 | 12/2010 | Beretta et al. |
| 2011/0015917 A1 | 1/2011 | Wang et al. |
| 2011/0082996 A1 | 4/2011 | Wester et al. |
| 2011/0145360 A1 | 6/2011 | Sheshagiri et al. |
| 2011/0176790 A1 | 7/2011 | Morris |
| 2011/0191677 A1 | 8/2011 | Morris |
| 2011/0225495 A1 | 9/2011 | Casalaina et al. |
| 2011/0252312 A1 | 10/2011 | Lemonik |
| 2011/0258532 A1 | 10/2011 | Ceze et al. |
| 2012/0066380 A1 | 3/2012 | Gao et al. |
| 2012/0066586 A1 | 3/2012 | Shemesh |
| 2012/0131485 A1 | 5/2012 | Svendsen et al. |
| 2012/0173966 A1 | 7/2012 | Powell et al. |
| 2012/0239598 A1 | 9/2012 | Cascaval et al. |
| 2012/0260157 A1 | 10/2012 | Zhu et al. |
| 2012/0330984 A1 * | 12/2012 | Fablet ................. G06F 17/2247 707/755 |
| 2012/0331228 A1 | 12/2012 | Shatz |
| 2012/0331406 A1 | 12/2012 | Baird et al. |
| 2013/0007100 A1 | 1/2013 | Trahan et al. |
| 2013/0031459 A1 | 1/2013 | Khorashadi et al. |
| 2013/0058414 A1 | 3/2013 | Tsuru |
| 2013/0061293 A1 | 3/2013 | Mao |
| 2013/0067086 A1 | 3/2013 | Hershko et al. |
| 2013/0185650 A1 | 7/2013 | Gutowitz et al. |
| 2013/0205244 A1 | 8/2013 | Decker et al. |
| 2013/0246906 A1 * | 9/2013 | Hamon ............... G06F 17/2252 715/234 |
| 2014/0026096 A1 | 1/2014 | Zhang et al. |
| 2014/0033019 A1 | 1/2014 | Zhang |
| 2014/0040139 A1 | 2/2014 | Brudnick et al. |
| 2014/0052702 A1 | 2/2014 | Fierro et al. |
| 2014/0053064 A1 | 2/2014 | Weber et al. |
| 2014/0109078 A1 | 4/2014 | Lang et al. |
| 2014/0126309 A1 | 5/2014 | Kelly et al. |
| 2014/0143651 A1 | 5/2014 | Klotzer et al. |
| 2014/0164960 A1 | 6/2014 | Kuo |
| 2014/0201809 A1 | 7/2014 | Choyi et al. |
| 2014/0215336 A1 | 7/2014 | Gärdenfors et al. |
| 2014/0281918 A1 * | 9/2014 | Wei ......................... H04L 67/02 715/234 |
| 2014/0310608 A1 | 10/2014 | Snyder et al. |
| 2015/0026566 A1 | 1/2015 | Hui |
| 2015/0052596 A1 | 2/2015 | Ayanam |
| 2015/0089352 A1 | 3/2015 | Conboy et al. |
| 2015/0135061 A1 | 5/2015 | Palanichamy et al. |
| 2015/0161087 A1 | 6/2015 | Khoo |
| 2015/0205462 A1 | 7/2015 | Jitkoff et al. |
| 2015/0205761 A1 | 7/2015 | Shah |
| 2015/0269065 A1 | 9/2015 | Bourd et al. |
| 2015/0271188 A1 | 9/2015 | Call |
| 2015/0279463 A1 | 10/2015 | Berke |
| 2016/0057220 A1 | 2/2016 | Gibbs et al. |
| 2016/0142914 A1 | 5/2016 | He et al. |
| 2016/0188279 A1 | 6/2016 | Rajamani et al. |
| 2016/0205088 A1 | 7/2016 | Sreesha et al. |
| 2016/0299764 A1 | 10/2016 | Chakra et al. |
| 2016/0313896 A1 | 10/2016 | Liang et al. |
| 2017/0302976 A1 | 10/2017 | Puttagunta et al. |
| 2017/0329554 A1 | 11/2017 | Voigt et al. |
| 2018/0004856 A1 | 1/2018 | Levi et al. |
| 2019/0079906 A1 | 3/2019 | Karppanen |

OTHER PUBLICATIONS

Gross, R., and A. Wightman, MarioNet Split Web Browser, p. 1, Jan. 1999, https://en.wikipedia.org/wiki/MarioNet_split_web_browser.

Hickson, I., Ed., Web Storage, W3C Working Draft, Oct. 29, 2009, pp. 11-18, http://www.w3.org/TR/2009/WD-webstorage-20091029/.

Jquery API Documentation, Feb. 10, 2010, Version 1.2, p. 162, http://api.jquery.com/serialize/.

Wellons, C., Precise JavaScript Serialization With ResurrectJS, Mar. 28, 2013, http://nullprogram.com/blog/2013/03/28/.

Garsiel, T., and P. Irish, How Browsers Work: Behind the Scenes of Modern Web Browsers, http://www.html5rocks.com/en/tutorials/internals/howbrowserswork/, published Aug. 5, 2011, pp. 1-62, retrieved Jun. 25, 2015.

Hayden, A.L., Customized Browser Images, U.S. Appl. No. 13/359,290, filed Jan. 26, 2012.

Jain, A.S., and D.L.R. Batni, Remote Session Preview Management, U.S. Appl. No. 14/180,245, filed Feb. 13, 2014.

* cited by examiner

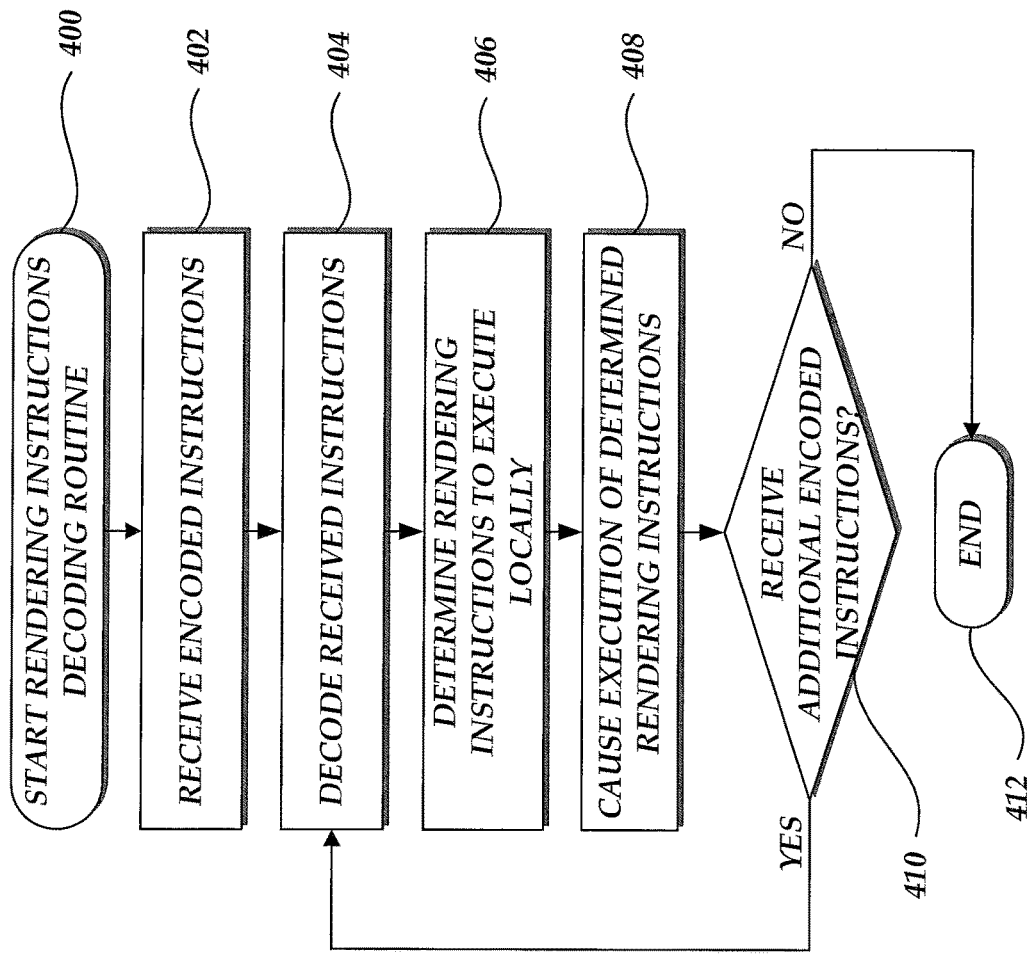

VECTOR-BASED ENCODING FOR CONTENT RENDERING

BACKGROUND

Generally described, computing devices and communication networks can be utilized to exchange information. In a common application, a computing device can request content from another computing device via the communication network. For example, a user at a personal computing device can utilize a software application process, typically referred to as a browser, to request a Web page from a server computing device via the Internet. In such embodiments, the user computing device can be referred to as a client computing device, and the server computing device can be referred to as a content provider.

With reference to an illustrative example, a requested Web page may be associated with a number of additional resources, including static content and dynamic content. For dynamic content, such as video images or video streaming, client computing devices receiving a continuous transmission of content from a content provider require consistent processing of the incoming dynamic content, such as decoding encoded content. From the perspective of a user utilizing a client computing device, a user experience can be defined in terms of the performance and latencies associated with obtaining a Web page, processing embedded resource identifiers, and rendering content on the client computing device. Latencies and performance limitations of any of the above processes may diminish the user experience. Additionally, latencies and inefficiencies may be especially apparent on computing devices such as netbooks, tablets, smartphones, and the like, which may have limited resources in terms of processing power, memory, or network connectivity.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 4 is a flow diagram depicting an illustrative rendering instructions decoding routine implemented by a browser application process in accordance with the present disclosure.

DETAILED DESCRIPTION

Figure 1:
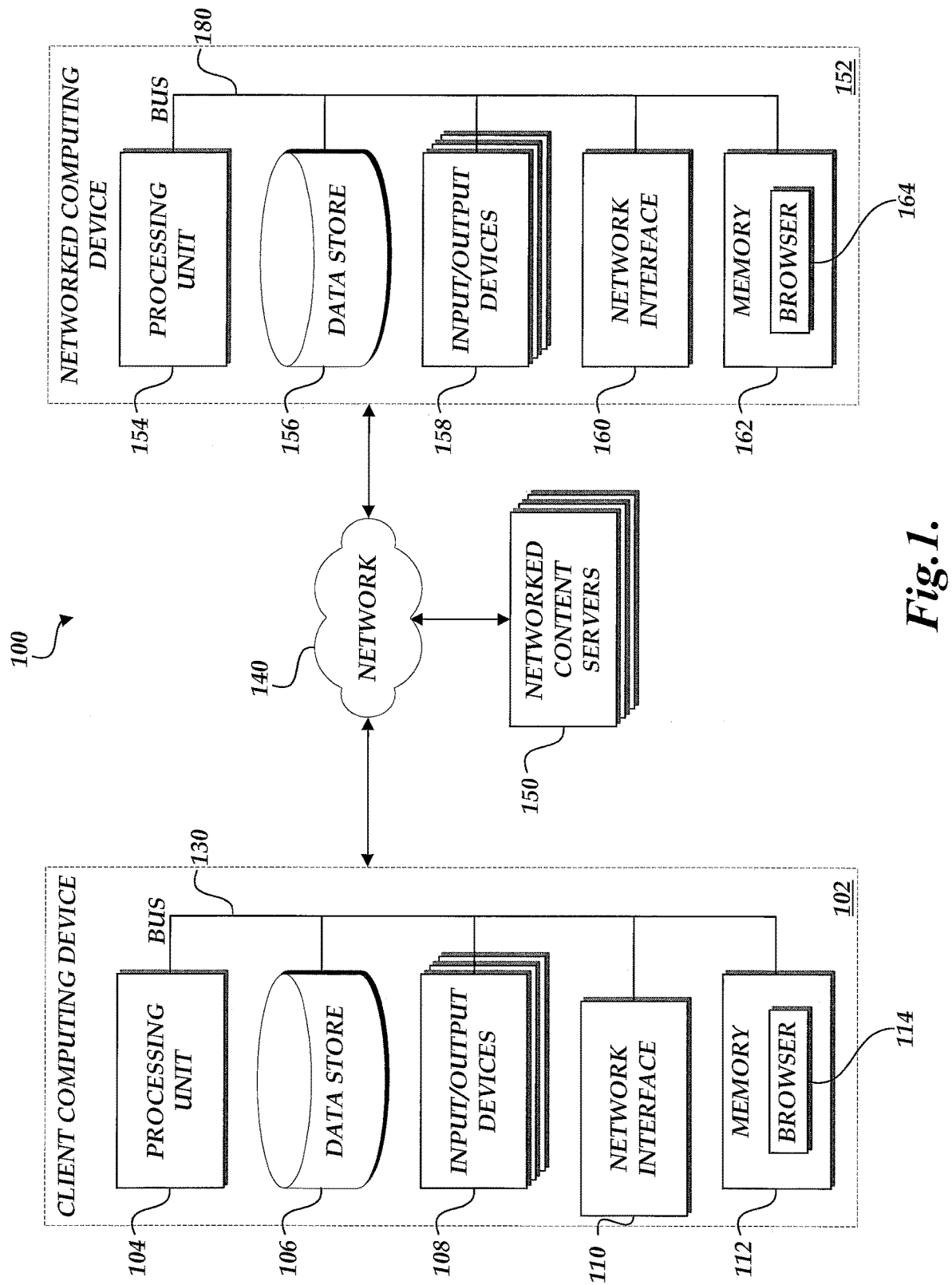
FIG. 1 is a schematic block diagram of an illustrative network topology including a browser application process executing on a client computing device, a browser process executing on a networked computing device, and a network interconnecting the client computing device and the networked computing device.

Generally described, aspects of the present disclosure are directed to the processing and display of Web content by a client computing device. More specifically, aspects of the present disclosure are directed to systems, methods, and computer-readable media related to remote processing of dynamic content associated with Web pages. Additionally, aspects of the present disclosure further relate to synchronization of data transmissions between a client computing device having a browser application and a network-based computing device having a browser application in order to render dynamic content on the client computing device.

With reference to an illustrative example, a user may cause a client computing device to load and execute a software browser application (henceforth referred to as a "browser") for accessing content provided by one or more content providers. Illustratively, the accessed content may include a collection of one or more network resources (e.g., a Web page) and embedded resources corresponding to content considered to be static in nature such as images, text, and the like. The embedded resources can also include content considered to be dynamic in nature, such as video, audio, executable code, and compilable scripts. Scripts may illustratively be written in JavaScript™, ECMAScript™, Jscript™, ActionScript™, Dart™, VBScript™, or other scripting languages. The dynamic content can be transmitted to the browser application as a series of one or more transmission for storage and processing on the client computing device. Alternatively, the dynamic content can be transmitted as a series of continuous transmissions, often referred to as a content stream or streaming, that can be processed by the browser without requiring (or allowing) the content to be stored on the client computing device.

Subsequent to the browser being loaded, a user or automated browser process may cause the client computing device to transmit a request to access content from a content provider ("content request"). The browse session request may include information identifying one or more sources for the requested content. The identifiers can be in the form of network addresses of network resources, such as a Web site or other network accessible piece of content. For example, the user may select or enter a URL (e.g., http://www.example.com) into a browser window, causing the client computing device to transmit a request for a new browse session to the content provider, including the selected URL. Illustratively, the content request from the client computing device may not be transmitted directly to a respective content provider. Rather, the content request from client computing device may be transmitted to a browser application instantiated on a network-based server and configured to work in conjunction with the client-based browser application. In this embodiment, the server-based browser application obtains the content request and transmits a content request to the content provider from the server-based browser application based on the content request transmitted by the client-based browser.

In an illustrative embodiment, the server-based browser may receive content from the content provider in response to the request. The browser may include, for example, a layout engine or rendering engine that parses the received content to identify and process various elements, such as HTML layout information, CSS information, embedded objects including static content and dynamic content. More specifically, in accordance with aspects of the present disclosure, the server-based browser processes at least a portion of the received content to generate at least the dynamic content that is to be displayed with the requested resource. Additionally, the server-based browser application then further processes the requested content, including the dynamic content to generate vector-based rendering instructions. Illustratively, the vector-based rendering instructions correspond to a set of instructions that cause a browser application utilizing a graphics library to be able to render content on a display. For example, the vector-based rendering instructions can correspond to a vector of instructions utilizing the Skia Graphics Engine and associated graphics library. In such embodiments, the vector based instructions distill complicated dynamic content, such as graphics, into simple components, such as lines, squares, circles, gradients, and the like.

After processing the received content, the server-based browser transmits the vector-based processing instructions (e.g., the encoded content) to the client-based browser. Utilizing a corresponding graphics engine and graphics library, the client-based browser processes that vector-based instructions (e.g., decodes) to render content for display to a user associated with the client computing device.

In some embodiments, the content provider can continue to transmit requested content to the server-based browser application, such as in the case of dynamic content that is transmitted via a series of transmissions or dynamic content that is continuously streamed from the content provider (or other designated source). In other embodiments, the execution of instructions, such as scripts included in the original content, can cause a change in the content to be displayed on the browser application. In accordance with aspects of the present application, as dynamic content changes, or causes changes, to the content to be displayed, the server-based browser application against processes the content to generate updated vector-based rendering instructions corresponding to the updated content. Additionally, the server-based browser application can further compare the vector-based rendering instructions corresponding to the updated content to identify a set of differences in the vector-based rendering instructions. The server-based browser application can then limit at least a portion of the subsequent transmissions to the client-based browser application to the differences in vector-based rendering instructions to limit the data required to generate the updated content on the client computing device. In some cases, the server-based browser may choose to transmit the full set of vector-based rendering instructions to the client-based browser, such as in a periodic refresh of content, if the differences exceed a threshold, based on a request from the client-based browser, based on instructions from the content provider and the like.

Although various aspects of the embodiments described in the present disclosure will focus, for purposes of illustration, on the remote processing of dynamic content associated with a web browser, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting FIG. 1 is a block diagram illustrative of a networked computing environment 100 for managing content request in accordance with the present disclosure. As illustrated in FIG. 1, the networked computing environment 100 includes a client computing device 102 ("client") operable to request content from networked content servers 150 via a communications network 140. In an illustrative embodiment, the client 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like.

In an illustrative embodiment, the client 102 includes necessary hardware and software components for establishing communications over the communications network 140. For example, the client 102 may be equipped with a network interface 110 that facilitates communications via the network 140. The network 140 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof.

The client 102 may also have varied local computing resources such as a central processing unit 104, data store 106, input/output devices 108, a bus interface 130, memory 112, and so forth. One skilled in the art will appreciate that the client 102 may have more or fewer components than those depicted in illustrative FIG. 1. In an illustrative embodiment, the memory 112 may contain inter alia an operating system and a browser application process. In some embodiments, the browser application process 114 may include components such as a client rendering engine utilizing a graphics library for encoding, decoding, and rendering content.

Similar to the client computing device 102, the networked computing device 152 illustratively includes necessary hardware and software components for establishing communications over the communications network 140, such as a central processing unit 154, data store 156, memory 162, bus interface 180, and so forth. The network computing device 152 may optionally be equipped with input/output devices 158 for direct user interaction, and may be equipped with a network interface 160 that facilitates communications on the network 140. One skilled in the art will appreciate that the networked computing device 152 may have more or fewer components than those depicted in illustrative FIG. 1. In an illustrative embodiment, the memory 162 may contain inter alia an operating system and a browser application process 164. In some embodiments, the browser application process 164 may include components such as a rendering engine utilizing a graphics library for encoding, decoding, and rendering content. In further embodiments, the client synchronization service 122 may be implemented as a stand-alone process that communicates with the browser application process 116, a plug-in or manageable component of the browser application process 116, or as other software.

The networked content servers 150 may illustratively be web servers configured to respond to requests for content via the communication network 140. In some aspects, the network content servers 150 provide dynamic content to the server-based browser 164 for transmission to a client browser 114. Further, the modules or components illustrated in FIG. 1 may include additional components, systems, and subsystems for facilitating the methods and processes. For example, in various embodiments, the client 102 may be centralized in one computing device, distributed across several computing devices, implemented by one or more virtual machine instances, and/or distributed through a network.

Figure 2A:
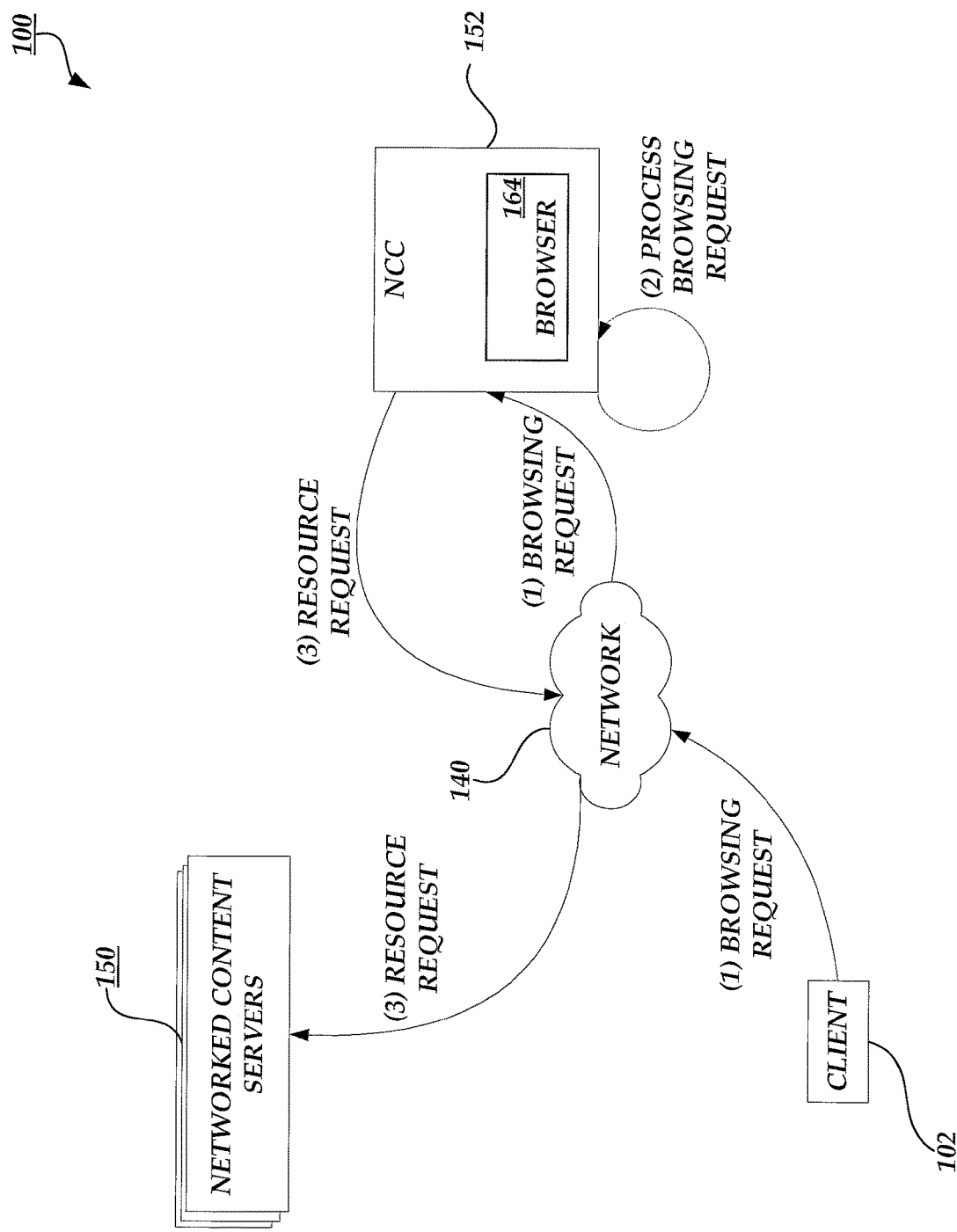
FIGS. 2A-2C are illustrative block diagrams of the network topology of FIG. 1 illustrating the transmission of encoded vector-based information between the networked computing device and the client computing device.
Figure 2B:
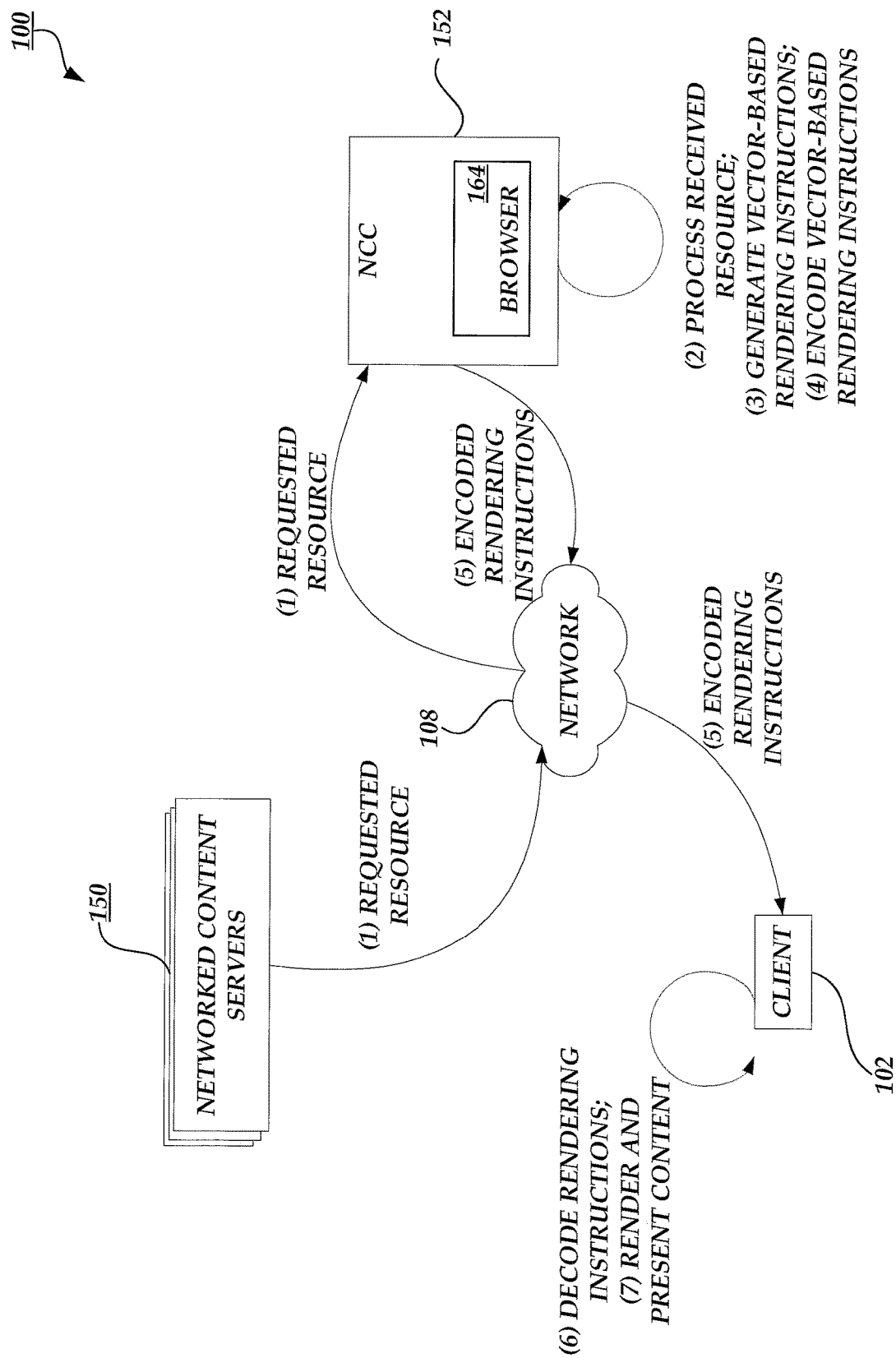
Figure 2C:
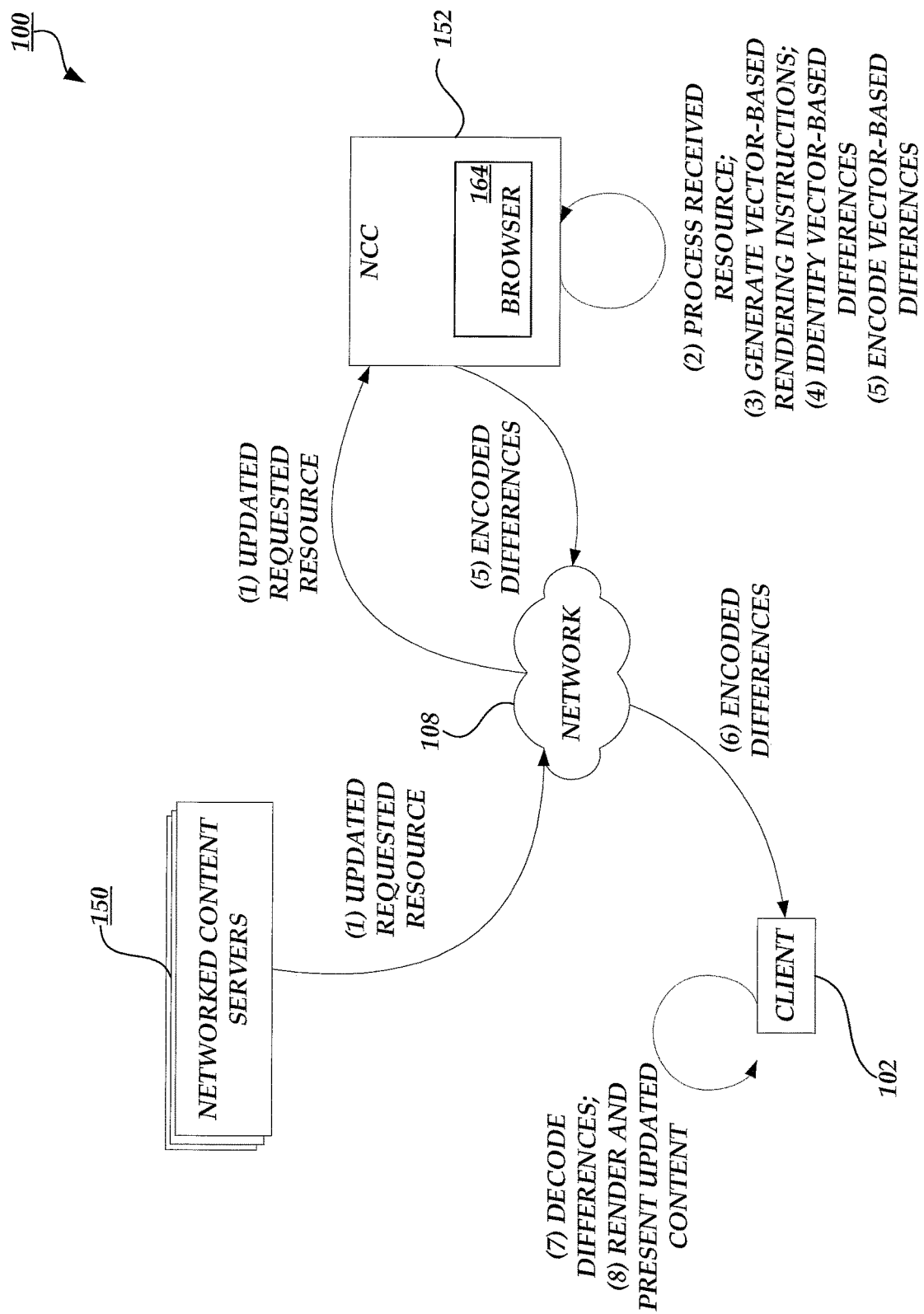

With reference now to FIGS. 2A-2C, block diagrams of the network topology of FIG. 1 illustrating the transmission of encoded vector-based information between the networked computing device and the client computing device will be described. With reference first to FIG. 2A, the process begins at (1) with generation of a browsing request from the client computing device 102. Illustratively, in one embodiment, a user can manipulate various interface devices or components to cause a browser application 114 to generate the content request. In other embodiments, the browser application 114, or other components, can automatically generate the content requests.

At (2), a server-based browser application 164 receives the content request from the client 102. At (3), the server-based browser application 165 generates an independent request to a corresponding networked content server 150. The independent request is based, at least in part on the content request from the client computing device 102, but is generated and transmitted from the server-based browser application 164.

Turning now to FIG. 2B, at (1), the networked content server 150 processes the content request and transmits the requested resource to the server-based browser application 164. As previously discussed, the requested content can be in the form of a markup language, such as HTML, that can also include references to embedded content. At (2), the server-based browser application 164 processes the returned content, which can include transmitted additional requests to one or more network content servers 150 for the embedded resources. Illustratively, the server-based browser application 164 processes the requested resources to be able to at least partially render content on a display screen.

At (3), the server-based browser application 164, such as via a graphics engine component, generates vector-based processing instructions corresponding to the processed requested resource. As previously described, illustratively the server-based browser application 164 includes a graphics engine that utilizes a library of graphics components, such as lines, circles, squares, etc., to distill graphic objects into simple components. At (4), the server-based browser application, via the graphics engine, then generates a set of instructions for utilizing the simple components of the graphics library to create the graphic objects. The set of instructions can be organized into a vector of processing instructions. For purposes of the present application the generation of the vector of instructions can be considered the encoding of the graphic content. At (5), the server-based browser application transmits the encoded rendering instructions to the client computing device 102 in response to the content request. Illustratively, the server-based browser application 164 would not need to transmit the underlying resource or the processed content along with the encoded rendering instructions. As such, the amount of data transmitted by the server-based browser application 164 to the client computing device 102 would be reduced.

With continued reference to FIG. 2B, at (6), the client-based browser application 114, via a compatible graphics engine, would decode the vector of instructions to identify a set of instructions used to generate the content. At (7), the client-based browser application 114 renders and presents the content, such as via an accessible display screen. One skilled in the relevant art will appreciate that the specific interaction between the server-based browser application 164 and the client-based browser application 114 can include additional or alternative protocol steps, including, but not limited, the instantiation of the server-based browser application, the authentication of the browser applications, the configuration of how the server based browser application and the client-based browser application will interact/communicate, the utilization of supplemental security or compression algorithms/protocols, and the like.

Turning now to FIG. 2C, as previously discussed, in some embodiments, the networked content servers 150 can provide an update of the requested resource, such as updated dynamic content or streaming content. At (1), the networked content server 150 transmits the updated content to the network-based browser 164. In other embodiments, the networked content server 150 can also independently generate updated dynamic content, such as by executing script commands, receiving instructions from other applications being executed by the network computing component 152 or receiving additional instructions or content from other networked content provider.

At (2), the server-based browser application 164, such as via a graphics engine component, generates vector-based processing instructions corresponding to the processed updated requested resource. As previously described, illustratively the server-based browser application 164 includes a graphics engine that utilizes a library of graphics components to distill graphic objects into simple components. At (3), the server-based browser application, via the graphics engine, then generates a set of instructions for utilizing the simple components of the graphics library to create the graphic objects. The set of instructions can be organized into a vector of processing instructions.

At (4), the server-based browser application 164 compares the generated vector-based processing instructions for the updated content with vector-based processing instructions previously transmitted to the client computing device 102. In one embodiment, the server-based browser application 164 compares the generated vector-based processing instructions with the most recently transmitted vector-based processing instructions. In other embodiments, the server-based browser application 164 may utilize one or more reference set of vector-based processing instructions that may serve as the comparison source even if subsequent vector-based processing instructions have been transmitted or additional differences have been previously identified.

Illustratively, the server-based browser application 164 utilizes the comparison between the vector-based processing instructions to identify differences in the vector-based processing instructions. At (5), the server-based browser application 164 encodes the identified vector-based processing instructions. In one embodiment, the server-based browser application 164 encodes the differences in manner that can be utilized by the client computing device 102 to update previously received vector-based processing instructions (including intervening updates) to update the vector-based processing instructions.

With continued reference to FIG. 2C, at (6), the server-based browser application 164 transmits the encoded differences to the client computing device via the communication network 140. At (7), the client-based browser application 114, via a compatible graphics engine, would decode the vector of instructions to identify a set of instructions used to generate the content. At (8), the client-based browser application 114 renders and presents the content, such as via an accessible display screen. By encoding the differences in the vector-based processing instructions, the server-based browser application 164 can mitigate not only the amount of data transmitted to the client computing device 102, but also the reduce the amount of processing required by the client-based browsing application 114 to render dynamic content.

Figure 3:
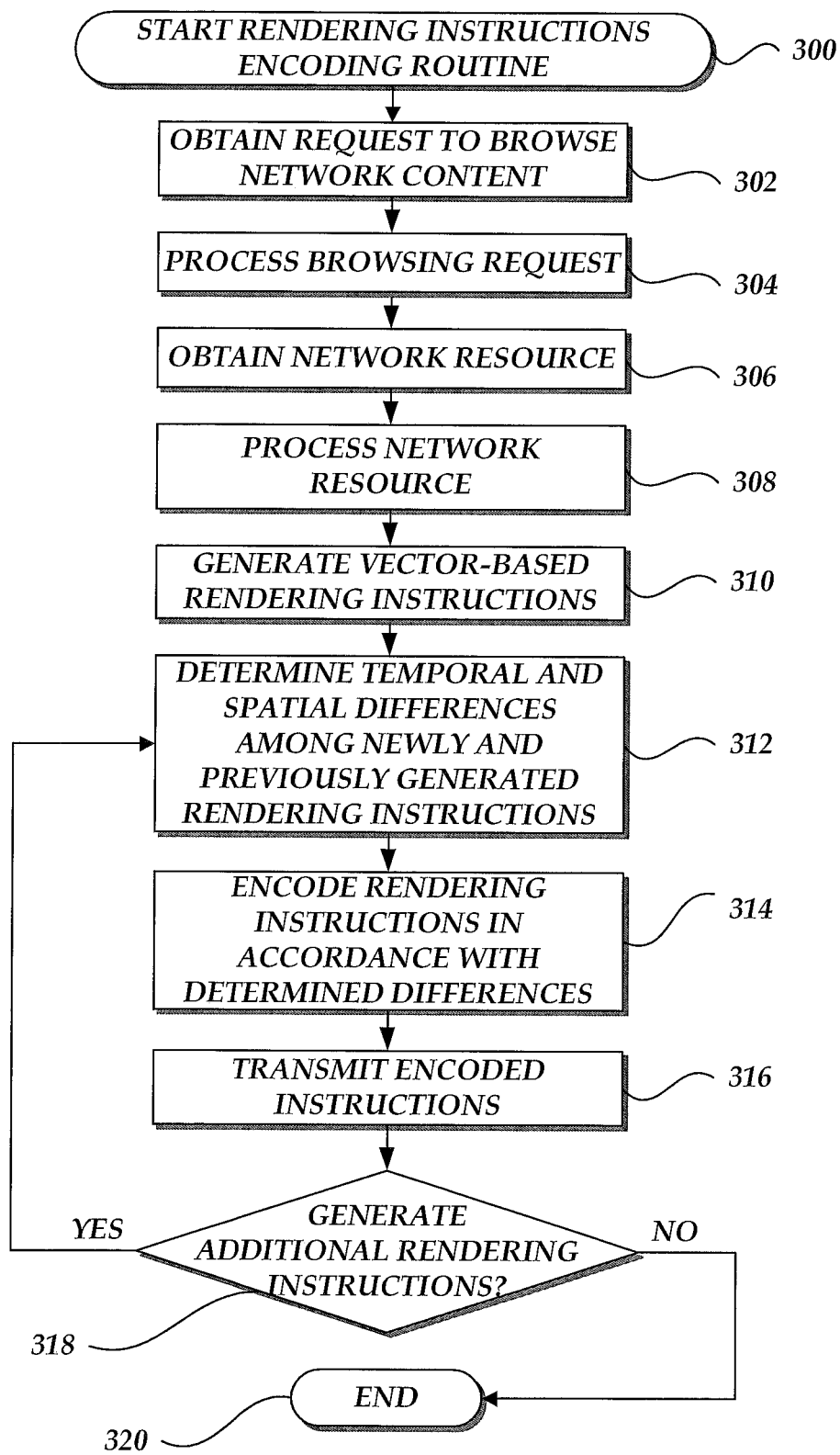
FIG. 3 is a flow diagram depicting an illustrative rendering instructions encoding routine implemented by a networked computing device in accordance with the present disclosure.

Turning now to FIG. 3, a flow diagram depicting an illustrative rendering instructions encoding routine 300 implemented by a networked computing device 152 in accordance with the present disclosure will be described. Illustratively, routine 300 will be described with relation to implementation by the network computing component 152, such as by the server-based browser application 164. However, one skilled in the relevant art will appreciate that additional or alternative components may also implement at least portions of routine 300.

At block 302, the server-based browser application 164 obtains a request for a network resource. As previously described, illustratively, the server-based browser application 164 obtains the content request from the client-based browser application 114. As described above, the content request can be in the form of a URL (or set of URLs) that can be resolved to identify one or more networked content providers 105. At block 304, the server-based browser application 164 processes the content request to transmit an independent request for content to the one or more networked content providers 150. In Some embodiments, the server-based browser application 164 may also supplement the received content request with additional information or may alternatively generate a content request that does not include the same information provided by the client-based browser application 114.

At block 306, the network-based browser application 164 receives the requested content from the networked content server 150. As previously discussed, the requested content can be in the form of a markup language, such as HTML, that can also include references to embedded content. Accordingly, at block 308, the server-based browser application 164 processes the returned content, which can include transmitted additional requests to one or more network content servers 150 for the embedded resources. Illustratively, the server-based browser application 164 processes the requested resources to be able to at least partially render content on a display screen.

At block 310, the server-based browser application 164, such as via a graphics engine component, generates vector-based processing instructions corresponding to the processed requested resource. As previously described, illustratively the server-based browser application 164 includes a graphics engine that utilizes a library of graphics components, such as lines, circles, squares, etc., to distill graphic objects into simple components. Illustratively, in the first instance of routine 300, the server-based browser application 164 may not have reference set of vector-based instructions in which to make a comparison. Accordingly, in this application, routine 300 may omit any comparison steps (blocks 312 and 314) and the full set of vector-based instructions will be encoded and transmitted as described below with regard to block 316.

In the alternative, routine 300 may be implemented in which there is a previously transmitted vector-based instructions or a reference set of vector-based instructions in which to make a comparison. In such embodiments, at block 312, the server-based browser application 164 compares the generated vector-based processing instructions for the updated content with vector-based processing instructions previously transmitted to the client computing device 102. In one embodiment, the server-based browser application 164 compares the generated vector-based processing instructions with the most recently transmitted vector-based processing instructions. In other embodiments, the server-based browser application 164 may utilize one or more reference set of vector-based processing instructions that may serve as the comparison source even if subsequent vector-based processing instructions have been transmitted or additional differences have been previously identified. Illustratively, the differences between the vector-based instructions can be characterized as temporal and spatial differences in accordance with how the vector-based rendering instructions are generated by the graphics engine.

At block 314, the server-based browser application 164 encodes the identified vector-based processing instructions. In one embodiment, the server-based browser application 164 encodes the differences in a manner that can be utilized by the client computing device 102 to update previously received vector-based processing instructions (including intervening updates) to update the vector-based processing instructions. At block 316, the server-based browser application transmits the encoded rendering instructions to the client computing device 102 in response to the content request. Illustratively, the server-based browser application 164 would not need to transmit the underlying resource or the processed content along with the encoded rendering instructions. As such, the amount of data transmitted by the server-based browser application 164 to the client computing device 102 would be reduced.

At decision block 318, a test is conducted to determine whether there are additional vector based rendering instructions. Illustratively, routine 300 may be implemented continuously in embodiments in which the dynamic content is being continuously modified or semi-continuously being modified, such as streaming application. In such embodiments, the server-based browser application 164 may be continuously generating vector-based processing instructions. Accordingly, the routine 300 returns to block 312. Alternatively, if no further vector-based processing instructions are available or if the time between receipt of additional vector-based processing instructions exceeds a threshold, routine 300 terminates at block 320.

Turning now to FIG. 4, a flow diagram depicting an illustrative rendering instructions decoding routine 400 implemented by a browser application process in accordance with the present disclosure will be described. Illustratively, routine 400 will be described with regard to implementation by a client-based browser application 114. However, one or more aspects of the routine 400 may be implemented by difference components of the client computing device 102 or other computing devices.

At block 402, the client-based browser application 114 obtains encoded instructions. Illustratively, the encoded instructions are responsive to a content request transmitted by the client-based browser application 114 to the network-based browser application 164 in the manner described above. At block 404, the client-based browser application 114, via a compatible graphics engine, would decode the vector of instructions to identify a set of instructions used to generate the content.

At block 406, the client-based browser application 114 determines which vector-based instructions to execute locally to present the content, such as via an accessible display screen. Illustratively, in the first iteration of routine 400, the client-based browser application 114 will utilize the full set of vector-based rendering instructions to render the content for display. In subsequent iterations of routine 400 and as described above, the encoded rendering instructions include only the differential (spatial and temporal) from a reference set of vector instructions, such as a previously transmitted full or partial set of vector-based rendering instructions. In these embodiments, the client-based browser application utilizes the decoded spatial and temporal differences to update the vector-based rendering instructions.

At block 408, the client-based browser application 114 causes execution of the identified vector-based instructions to render the content for presentation. Illustratively, the client-based browser application 114 can utilize a graphics engine and associated libraries to execute the vector based instructions.

At decision block 408, a test is conducted to determine whether additional encoded instructions have been received.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for remote content rendering comprising:

in response to a content browsing request from a client computing device, obtaining, by a network based browser software application instantiated at a network computing component, a network resource from a content provider, wherein the network resource is indicated by the content browsing request;

determining, by the network based browser software application, based at least in part on the content of the network resource, a first set of display objects from a library of vector-based display objects, wherein the first set of display objects, when rendered, corresponds to at least a first portion of the network resource;

generating, by the network computing component, a first set of vector-based rendering instructions that, when executed on the client computing device, cause generation of at least a portion of the first set of display objects based at least in part on reference to a local copy of the library of vector-based display objects;

encoding, by the network computing component, the first set of vector-based rendering instructions into first data;

transmitting the first data from the network computing component to the client computing device, wherein the client computing device decodes the first data to obtain the first set of vector-based rendering instructions;

determining, by the network based browser software application, based at least in part on the content of the network resource, a second set of display objects from the library of vector-based display objects, wherein the second set of display objects, when rendered, corresponds to at least a second portion of the network resource;

generating, by the network computing component, a second set of vector-based rendering instructions, which when executed on the client computing device, cause presentation of at least a portion of the second set of display objects based at least in part on reference to the local copy of the library of display objects;

determining, by the network computing component, at least one spatial or temporal difference between the first set and second set of vector-based rendering instructions;

determining that the at least one spatial or temporal difference between the first set and second set of vector-based rendering instructions exceeds a threshold;

in response to the determination that the at least one spatial or temporal difference between the first set and second set of vector based rendering instructions exceeds the threshold, encoding, by the network computing component, the at least one spatial or temporal difference between the first set and the second set of vector-based rendering instructions into second data; and transmitting the second data from the network computing component to the client computing device, wherein the client computing device decodes the second data to obtain the second set of vector-based rendering instructions.

2. The computer-implemented method of claim 1, wherein the network based browser software application is executed on a first virtual machine instance hosted on the network computing component.

3. The computer-implemented method of claim 2, wherein the at least one spatial or temporal difference between the first set and second set of vector-based rendering instructions is determined by a second virtual machine instance hosted on the network computing component.

4. The computer-implemented method of claim 1 further comprising:

generating, by the network computing component, a third set of vector-based rendering instructions, which when executed on the client computing device, cause presentation of at least a portion of a third set of display objects that, when rendered, correspond to at least a third portion of the network resource; and determining, by the network computing component, that the third set of vector-based rendering instructions is substantially similar to the first set of vector-based rendering instructions, wherein the third set of vector-based rendering instructions is not encoded by the network computing component.

5. The computer-implemented method of claim 1, wherein the at least one spatial or temporal difference between the first set and second set of vector-based rendering instructions includes at least one of a difference in coordinates, size, shape, color, gradient, or timing with respect to one or more vectors.

6. A system for remote content rendering comprising:

a first processor and a first memory for executing first computer executable instructions, the first computer executable instructions implementing a network computing component that is operable to at least:

obtain a network resource, wherein the network resource is requested by a client computing device in communication with the network computing component;

generate a first set of rendering instructions based at least in part on the content of the network resource and a library of vector-based display objects, wherein the first set of rendering instructions, when executed on the client computing device, cause presentation of a first set of display objects that correspond to at least a first portion of the network resource;

transmit a first representation of the first set of rendering instructions to the client computing device;

generate a second set of rendering instructions based at least in part on the content of the network resource and the library of vector-based display objects, wherein the second set of rendering instructions, when executed on the client computing device, cause presentation of a second set of display objects that correspond to at least a second portion of the network resource;

determine at least one difference between the first set and second set of rendering instructions;

determine that the at least one difference exceeds a threshold; and in response to the determination that the at least one difference exceeds the threshold, transmit a second representation of the second set of rendering instructions to the client computing device, wherein the second representation is an encoding of the at least one difference between the first set and the second set of rendering instructions; and the client computing device comprising a second processor and a second memory for executing second computer executable instructions, the client computing device operable to at least:

receive the first representation of the first set of rendering instructions;

derive the first set of rendering instructions from the first representation;

execute the first set of rendering instructions based at least in part on reference to a local copy of the library of vector-based display objects;

receive the second representation of the second set of rendering instructions;

derive at least one portion of the second set of rendering instruction based, at least in part, on the second representation; and execute the at least one portion of the second set of rendering instructions based at least in part on reference to the local copy of the library of vector-based display objects.

7. The system of claim 6, wherein the client computing device is further operable to derive the at least one difference from the second representation and wherein the client computing device derives the at least one portion of the second set of rendering instructions based on the first set of rendering instructions and the at least one difference.

8. The system of claim 6, wherein the client computing device is further operable to generate a third set of rendering instructions based on the first set of rendering instructions and the second representation of the second set of rendering instructions.

9. The system of claim 8 wherein the client computing device executes the third set of rendering instructions before executing the at least one portion of the second set of rendering instructions and after executing the first set of rendering instructions.

10. The system of claim 6, wherein the first and second sets of rendering instructions are vector-based.

11. The system of claim 6, wherein the first and second sets of rendering instructions are organized in accordance with respective hierarchical structures.

12. The system of claim 6, wherein the first and second representations are generated in accordance with the library of vector-based display objects.

13. The system of claim 6, wherein the network resource includes at least one of a Web page, Web application, picture, animation, video, audio, or script code.

14. A non-transitory computer readable storage medium storing computer executable instructions that when executed by one or more processors perform operations comprising:
   obtaining a network resource, wherein the network resource is requested by a client computing device;
   generating a first set of rendering instructions based at least in part on the content of the network resource and a library of vector-based display objects, wherein the first set of rendering instructions, when executed on the client computing device, cause presentation of a first set of display objects that correspond to at least a first portion of the network resource;
   transmitting a first representation of the first set of rendering instructions to the client computing device;
   generating a second set of rendering instructions based at least in part on the content of the network resource and the library of vector-based display objects, wherein the second set of rendering instructions, when executed on the client computing device, cause presentation of a second set of display objects that correspond to at least a second portion of the network resource;
   determining at least one difference between the first set and second set of rendering instructions; and
   in response to a determination that the at least one difference exceeds a threshold, transmitting a second representation of the second set of rendering instructions to the client computing device, wherein the second representation is an encoding of the at least one difference between the first set and the second set of rendering instructions.

15. The non-transitory computer readable storage medium of claim 14, wherein the operations further comprise processing the network resource to derive the first set of display objects.

16. The non-transitory computer readable storage medium of claim 15, wherein each rendering instruction of the first set of rendering instructions is associated with one of the first set of display objects.

17. The non-transitory computer readable storage medium of claim 14, wherein generating a second set of rendering instructions comprises:
   determining that the at least one difference is below a threshold; and
   encoding the at least one difference with reference to the first set of rendering instructions.

18. The non-transitory computer readable storage medium of claim 14, wherein generating a second set of rendering instructions comprises:
   determining that the at least one difference is above a threshold; and
   encoding the at least one difference without reference to the first set of rendering instructions.

* * * * *